(No Model.) 5 Sheets—Sheet 1.
S. D. MURRAY.
PNEUMATIC APPARATUS FOR HANDLING SEED COTTON.
No. 582,542. Patented May 11, 1897.
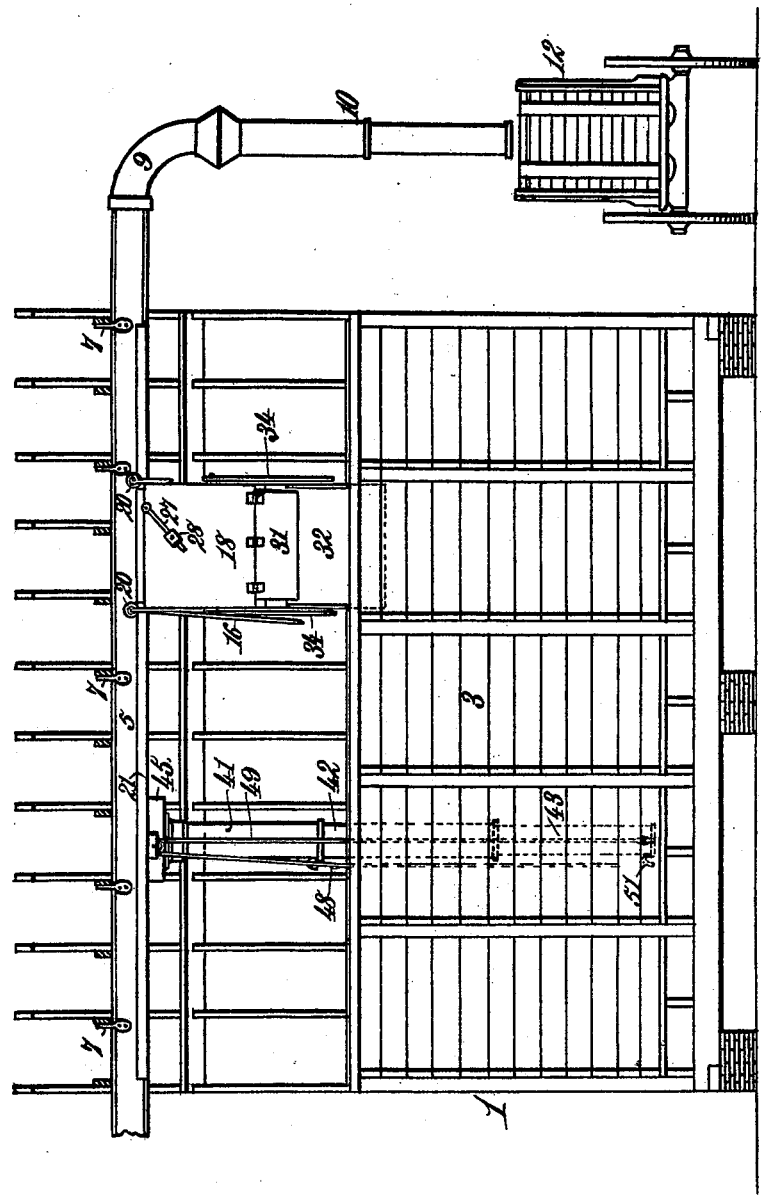
Witnesses.
Robert Everett.
Albert H. Norris.
Inventor:
Stephen D. Murray.
By James L. Norris
Atty.

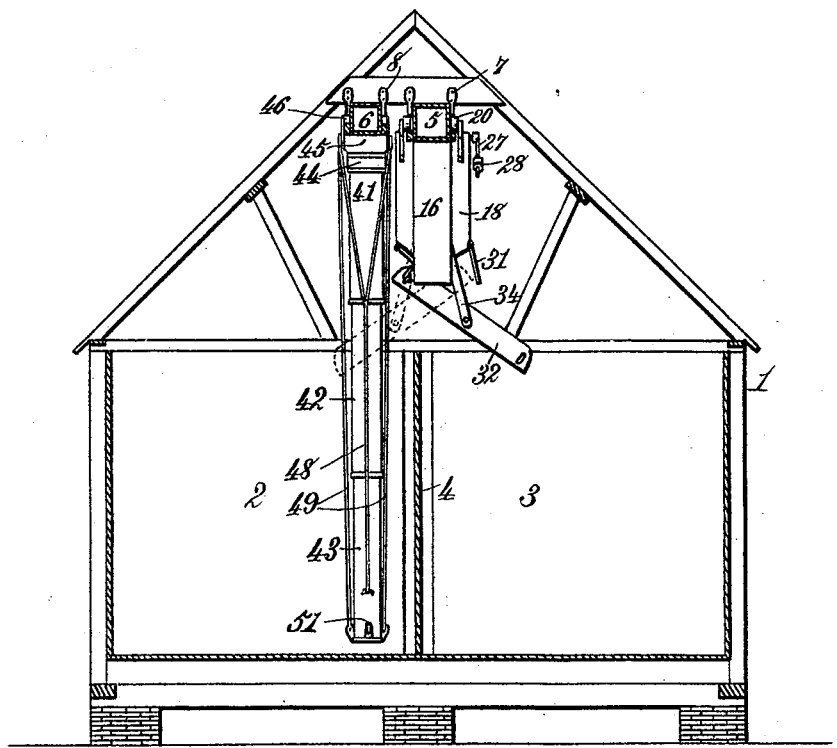

(No Model.) 5 Sheets—Sheet 3.
S. D. MURRAY.
PNEUMATIC APPARATUS FOR HANDLING SEED COTTON.
No. 582,542. Patented May 11, 1897.
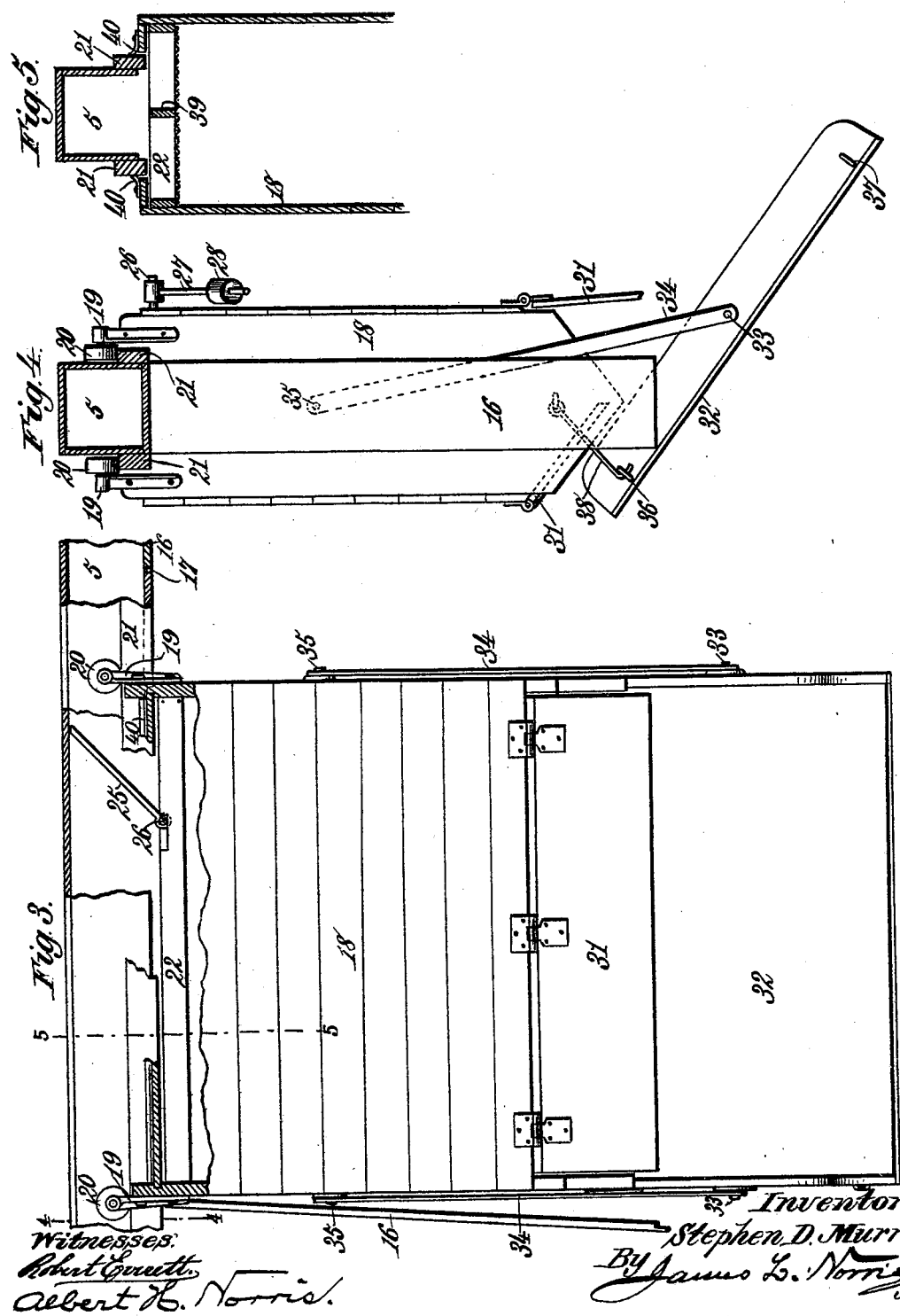

(No Model.)  5 Sheets—Sheet 4.
S. D. MURRAY.
PNEUMATIC APPARATUS FOR HANDLING SEED COTTON.
No. 582,542. Patented May 11, 1897.
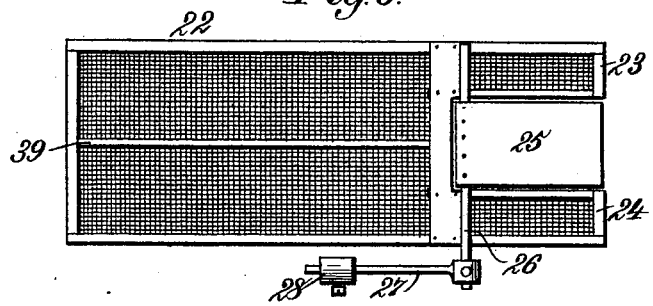
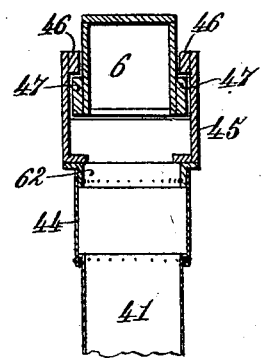
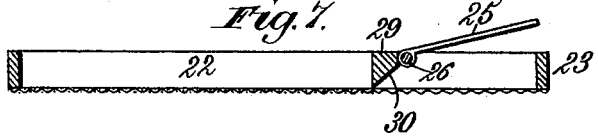
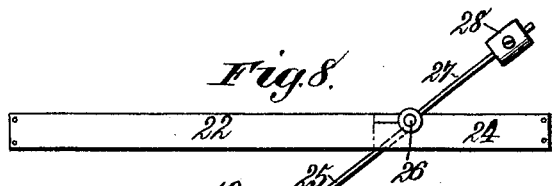
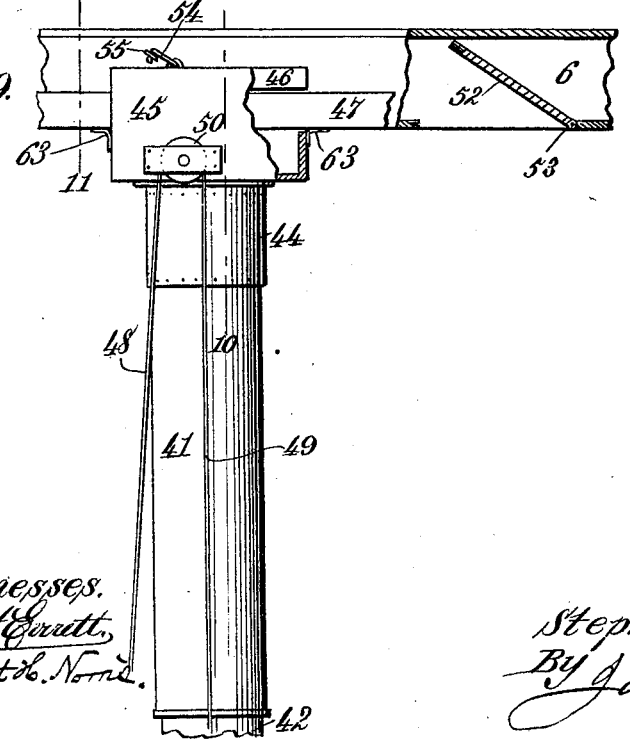
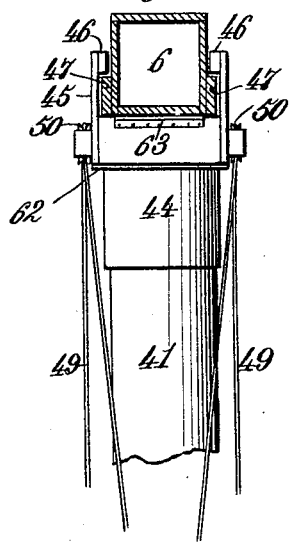
Witnesses.
Robt Garrett
Albert H. Norris
Inventor.
Stephen D. Murray.
By James L. Norris
Atty.

(No Model.) 5 Sheets—Sheet 5.
S. D. MURRAY.
PNEUMATIC APPARATUS FOR HANDLING SEED COTTON.
No. 582,542. Patented May 11, 1897.
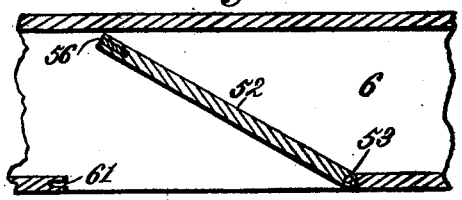
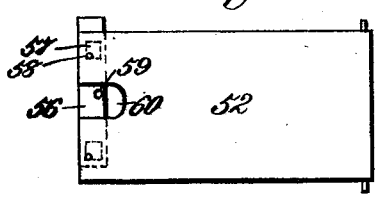
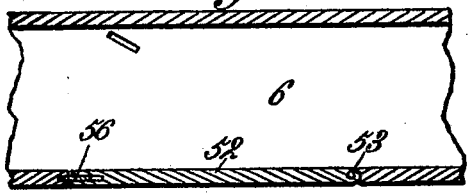
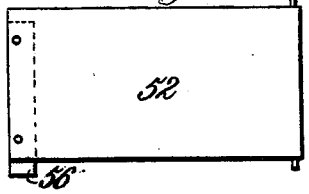
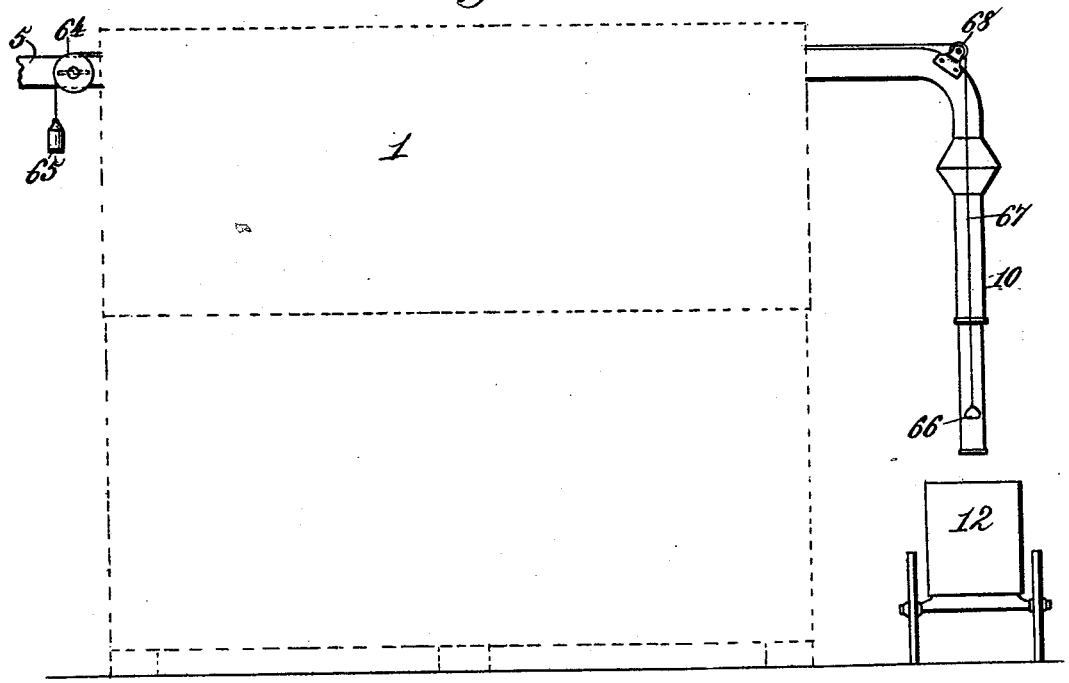
Witnesses.
Inventor.
Stephen D. Murray.
By James L. Norris.
Atty.

UNITED STATES PATENT OFFICE.

STEPHEN D. MURRAY, OF DALLAS, TEXAS.

PNEUMATIC APPARATUS FOR HANDLING SEED-COTTON.

SPECIFICATION forming part of Letters Patent No. 582,542, dated May 11, 1897.

Application filed June 22, 1896. Serial No. 596,522. (No model.)

*To all whom it may concern:*

Be it known that I, STEPHEN D. MURRAY, a citizen of the United States, residing at Dallas, in the county of Dallas and State of Texas, have invented new and useful Improvements in Pneumatic Apparatus for Handling Seed-Cotton, of which the following is a specification.

This invention relates, primarily, to the elevation or removal of seed-cotton from a receptacle, such as a wagon or other vehicle, and the distribution of this seed-cotton into a cotton-storage building or house or into bins or compartments provided therein, and, secondarily, to the elevation or removal of the seed-cotton from the storage building or house or the bins or compartments and the delivery of the same to the gin-house or the gins, where the lint-cotton is separated from the seed.

It has heretofore been proposed to elevate seed-cotton from a wagon or other source of supply by suction and to deliver or discharge the same from the suction apparatus at various points—as, for example, into the feeders of gins or into bins in a cotton-storage house; but in all prior apparatus of which I am aware an independent or separate delivering or discharging device or mechanism is essential at each and every point where it is desired to deliver or discharge the seed-cotton out of the suction apparatus.

The employment of a large number of discharging devices or mechanisms necessarily complicates the entire pneumatic apparatus and is expensive and therefore objectionable.

The chief object of my present invention is to simplify apparatus of the character referred to and enable a seed-cotton-discharging device, while maintained in operative connection with a conduit or flue through which the seed-cotton is moved from the wagon or other vehicle or receptacle, to be moved from place to place for the purpose of discharging the cotton at any desired point—as, for example, into any one of the series of storage bins or compartments, from which the seed-cotton may be subsequently removed and conveyed to cotton-gins.

The invention also has for its object to provide new and improved means whereby the seed-cotton can be removed from different points or from any one of a plurality of storage bins or compartments and conducted to the gin-house or to the cotton-gins, where the lint-cotton is separated from the seed.

The invention also has for its object to improve and simplify pneumatic apparatus or mechanism designed for handling or removing seed-cotton from one point to another.

To accomplish all these objects, my invention involves the features of construction, the combination or arrangement of devices, and the principles of operation hereinafter described and claimed, reference being made to the accompanying drawings, in which—

Figure 1 is a detail elevation looking at the interior of a cotton-storage building or house provided with my invention, the side and portions of the roof of the building being omitted to more clearly illustrate the essential parts of my improved pneumatic apparatus. Fig. 2 is a cross-sectional view of the building or house, showing portions of the roof of the same and my invention applied thereto. Fig. 3 is a detail side elevation, on a larger scale than Figs. 1 and 2, showing the cotton-discharging box or chute and a portion of the conduit or flue with which it coöperates. Fig. 4 is a vertical sectional view taken on the dotted line 4 4, Fig. 3. Fig. 5 is a detail vertical sectional view taken on the dotted line 5 5, Fig. 3. Fig. 6 is a detail top plan view of the screen-frame and screen designed to be arranged in the upper end of the cotton-discharging box or chute. Fig. 7 is a longitudinal sectional view of the same, taken on the dotted line 7 7, Fig. 6. Fig. 8 is a detail side view of the screen-frame, showing the deflecting-valve turned down to permit a traveling movement of the cotton-discharging box or conduit. Fig. 9 is a detail side view showing the telescopic suction device and a portion of the conduit or flue with which it coöperates. Fig. 10 is a vertical sectional view of the same, taken on the dotted line 10 10, Fig. 9. Fig. 11 is a similar view taken on the dotted line 11 11, Fig. 9. Fig. 12 is a detail longitudinal sectional view of a portion of the conduit or flue which is designed to convey the seed-cotton to the ginnery or cotton-gins, to clearly show one of the doors by which this conduit or flue is made to communicate with the telescopic suction device.

Fig. 13 is a bottom plan view of the door shown in Fig. 12. Fig. 14 is a top plan view of the same. Fig. 15 is a detail sectional view showing the manner in which the locking-bolt of the door shown in Fig. 12 holds the door in its closed position, and Fig. 16 is a detail side elevation showing a modification of my invention.

In order to enable those skilled in the art to make and use my invention, I will now describe the same in detail, referring to the drawings, wherein—

The numeral 1 indicates a cotton-storage building or house, which may be of any construction suitable for the purpose in hand, and which is interiorly provided with two rows of cotton-storage bins or compartments 2 and 3, arranged opposite each other and divided or separated one row from the other by a vertical partition or wall 4.

Any number of bins or compartments may be provided in each row, and they may be of any required depth.

Instead of arranging the bins or compartments in two rows opposite each other, as shown, they may be otherwise arranged to suit the conditions required.

The walls of the bins or compartments may be constructed in any desired or suitable manner.

The drawings are not intended to illustrate the entire construction of the building or house, as this may be variously modified, and although I have shown the building or house as constructed with a hip-roof I do not confine myself to this particular construction.

The roof-timbers should be suitably arranged to support the two cotton-conveying conduits or flues 5 and 6, which are preferably placed parallel with each other near the apex of the roof. These conduits or flues may be of any suitable construction, but as here shown they are substantially square in cross-section and composed of boards or timbers. The upper portions of the conduits or flues are provided with attached brackets or lugs 7 and 8, bolted or otherwise secured to the roof-timbers for the purpose of suspending the conduits or flues therefrom. The conduit or flue 5 extends at one end to the exterior of the building or house and is provided with an elbow 9 and a pendent or perpendicular telescopic section 10, adapted to be placed at its lower end in proper position to take seed-cotton from a receptacle 12, which may be the wagon or vehicle by which the seed-cotton is conveyed from the cotton-field. The other end of this cotton-conveying conduit or flue 5 is designed to connect with the suction-flue 13 of an air-suction apparatus or fan 14, preferably arranged in the gin-house or ginnery, usually located at some distance from the cotton-storage building or house. The air-suction apparatus or fan may be of any known type, and the suction-flue 13 is provided with a valve 15, designed to be opened and closed periodically or at intervals for a purpose which will hereinafter appear.

A valve operated periodically or at intervals to open and close the suction-flue of a pneumatic apparatus for handling cotton is well known in the art, and therefore I do not deem it necessary to illustrate and describe any particular mechanism for operating the valve, especially in view of the fact that it is possible, although not so desirable, to operate the valve manually at regular or other intervals to close and open communication between the air-suction apparatus or fan and the cotton-conveying conduit or flue 5. The conduit or flue 5 is provided at intervals with discharge-openings adapted to be opened and closed by suitable doors 16. These doors are preferably hinged at one end, as at 17, so that they can drop downward to open the discharge-openings or be raised to close the same.

When the doors are closed, they constitute continuations or parts of the bottom of the conduit or flue, and they may be held closed through the medium of door-buttons or any other devices suitable for the purpose in such manner that any door can be released and dropped downward, as shown in Fig. 3, to open a cotton-discharging opening and place the conduit or flue in communication with the cotton-discharging box or chute 18. This box or chute is designed to travel longitudinally with relation to the cotton-conveying conduit or flue 5, so that the upper end of the box or chute can be placed in communication with the interior of the conduit or flue through any one of the discharge-openings which are controlled by the doors 16, before explained.

The cotton-discharging box or chute 18 may be made to travel in any suitable manner or by any desired means, but as here shown it is suspended from the conduit or flue 5 through the medium of hangers 19, attached to the box or chute and provided at their upper ends with wheels or roller-bearings 20, mounted on rails or tracks 21, secured to the opposite sides of the conduit or flue. The wheel-hangers 19, wheels or roller-bearings 20, and tracks 21 may be of any suitable construction, whereby these parts are maintained in operative connection, while permitting the box or chute to be moved or shifted longitudinally along the conduit or flue 5.

The number of discharge-openings and doors 16 provided in the conduit or flue 5 is preferably the same as the number of cotton bins or compartments at either side of the partition 4, so that by placing the box or chute in communication with the conduit or flue 5 at the proper discharge-opening the cotton can be discharged into any one of the bins or compartments, as will more fully hereinafter appear.

The top portion of the box or chute is provided with a horizontally-arranged screen 22, (best seen in Fig. 6,) which at one end portion is divided into two oppositely-arranged screen-sections 23 and 24, between which a cotton-deflecting valve 25 is adapted to move when swung upon or with its shaft or rod 26, which is mounted in suitable bearings in the upper end of the box or chute and extends to the exterior thereof, where it is provided with an arm 27, carrying an adjustable weight 28. In juxtaposition to the point where the shaft 26 is journaled the frame of the screen 22 is provided with a cross-bar 29, having a beveled face 30, against which the cotton-deflecting valve 25 will rest when this valve is swung from the conduit or flue 5 downward between the screen-sections 23 and 24 to the inclined position shown in Fig. 8. The cotton-deflecting valve 25, when turned upward to extend across the conduit or flue 5, is preferably stopped so that it will stand in the inclined position shown in the drawings. This may be accomplished through the medium of any suitable stop, but in the present example the free end of the valve 25 strikes the top wall of the conduit or flue 5, and thus stops the valve in the inclined position represented.

The weighted arm 27 of the shaft 26 will hold the valve when turned into the conduit or flue 5, as shown in Fig. 3, or when turned downward between the screen-sections 23 and 24 into the cotton-discharging box or chute 18, as shown in Fig. 8. When the valve is swung upward or into the conduit or flue 5, it will intercept and deflect the cotton, and air drawn through the conduit or flue by the suction apparatus 14 will cause the cotton to descend between the sections 23 and 24 into the box or chute, while the air will pass around the valve and return to the conduit or flue 5 through the screen 22, as will be understood.

The cotton-discharging box or chute 18 may be composed of boards or timbers assembled and united in any suitable manner, and preferably the box or chute is very narrow as compared to its length.

The number of wheel-hangers and wheels or roller-bearings for supporting and suspending the box or chute may be increased or diminished to any required extent, but ordinarily a hanger and wheel or roller-bearing at each corner of the box or chute will be sufficient.

The lower end of the box or chute is preferably made sloping and is designed to be opened and closed through the medium of two oppositely-arranged doors, flaps, or valves 31, which may be of any suitable construction, but which, as here shown, are pivoted to the opposite sides of the box or chute and are adapted to close, respectively, between the sloping lower edges thereof. The flaps or valves 31 may be of any suitable material and of any desired construction whereby they will automatically close when the air-suction apparatus 14 is set into operation and is in communication with the conduit or flue 5 to raise the seed-cotton from the receptacle 12 and draw it through the telescopic section 10 into the main body of the conduit or flue.

The lower end of the cotton-discharging box or chute 18 is provided with a suspended apron or shoe 32, which is adapted to be turned to the position indicated by full lines in Figs. 3 and 4 and to be shifted and its position reversed, so that it will stand in the inclined position indicated by dotted lines in Fig. 2, whereby the cotton descending through the box or chute 18 can be caused to discharge into any one of the bins or compartments at either side of the upright partition or wall 4.

The apron or shoe 32 is pivotally attached centrally, as at 33, to the lower ends of links 34, which at their upper ends are pivoted, as at 35, to the end walls of the box or chute 18.

The apron or shoe 32 is provided at its ends with eyes 36 and 37, adapted to be engaged by hooks 38, preferably pivotally attached to the end walls of the box or chute 18, whereby the apron or shoe may be held or locked either in the inclined position indicated by full lines in Figs. 2 and 4 or in the inclined position indicated by dotted lines in Fig. 2.

The hooks and eyes are only represented as typical of many devices which may be employed for holding or locking the apron or shoe in either one of the positions mentioned for the purpose of discharging the cotton into the bins or compartments at either side of the partition which divides or separates one row of bins from the other.

The apron or shoe may be of any construction suitable for receiving the seed-cotton from the lower end of the box or chute and directing it into any one of the bins or compartments.

The main body of the screen 22 is attached at its longitudinal edges to the side bars at the upper end of the cotton-discharging box or chute 18, and preferably the screen is supported along its median line through the medium of a supporting-bar 39, Fig. 6. The purpose of dividing the screen into two sections 23 and 24, as best seen in Fig. 6, is to permit the deflecting-valve 25 to be turned upward and downward between these two screen-sections, as will be obvious without further explanation.

It is desirable to prevent the entrance of air at the longitudinal edges of the discharging box or chute where they lie contiguous to or near the rails or tracks 21, and this can be accomplished in a very simple manner by applying longitudinal strips 40 of rubber or any other flexible material to the upper edges of the box or chute, so that they will press against the tracks or rails and exclude the entrance of air. Any other means, however, for this purpose may be employed.

The box or chute, as before stated, is susceptible of being moved or shifted longitudinally with relation to the cotton-conveying conduit or flue 5 for the purpose of placing the upper end of the box or chute in communication with the interior of the conduit or flue through any one of the door-openings controlled by the door 16.

In the practical operation of the cotton discharging and distributing parts of my invention the telescopic end of the air-suction conduit or flue 10 is placed in proper condition to take the seed-cotton from the receptacle, wagon, or vehicle 12. The action of the air-suction apparatus or fan 14 in the gin-house or ginnery exhausts the air from the conduit or flue 5, causes the doors, flaps, or valves 31 to close against the sloping edges of the lower end of the box or chute, and draws the seed-cotton from the receptacle, wagon, or vehicle into the conduit or flue.

Assuming that the box or chute has been placed in communication with the conduit or flue at one of the door-openings and the deflecting-valve 25 has been adjusted to extend across the conduit or flue, as shown in Fig. 3, the traversing motion of the air and seed-cotton through the conduit or flue will be arrested by the valve 25 and caused to descend, the seed-cotton passing downward into the box or chute, while the air, as hereinbefore stated, will flow around the deflecting-valve and return through the screen 22 into the conduit or flue, and thence pass to the air-suction apparatus or fan in the gin-house or ginnery. The cotton accumulates in the box or chute during the time that the air-suction apparatus or fan is in operation and in communication with the conduit or flue 5. At certain intervals the valve 15 is operated to cut off communication between the air-suction apparatus or fan and the conduit or flue 5, whereupon the doors, flaps, or valve 31 will automatically fall open and the cotton contained in the box or chute will descend onto the apron or shoe 32 and be discharged into one of the cotton-storage bins or compartments. I wish it understood that while I prefer to employ these cotton-storage bins or compartments within the cotton-storage building or house it is possible to dispense with them and to employ the box or shoe to deposit the cotton at different points in the building or house. The valve 15 can be operated manually; but geared valves for stopping the suction at intervals in pneumatic apparatus for handling cotton are well known in the art, as before stated, and since nothing novel in the construction of the valve-operating devices is claimed by me I do not deem it necessary to illustrate the same.

After the contents of the box or chute have been discharged, as above stated, and the valve 15 is made to establish communication between the air-suction apparatus or fan 14 and the conduit or flue 5, the operation above described will be repeated, and by shifting the box or chute along the conduit or flue the cotton can be deposited into the several bins or at different points in the storage building or house.

It will be obvious that by adjusting the apron or shoe 32 the cotton can be discharged into the bins at either side of the vertical partition or wall which divides or separates one row of bins from the other, and that this is accomplished through the medium of a single discharging box or chute, whereby this class of apparatus is materially simplified and rendered more efficient and economical in operation.

The seed-cotton discharged or deposited in the bins or compartments requires to be transported to the gin-house or ginnery, where the ginning operation is carried into effect. To accomplish this, I arrange in operative connection with the conduit or flue 6 a suction device for conveying the seed-cotton from any one of the bins or compartments into the conduit or flue 6, which serves to carry the cotton to the gin-house or ginnery. That portion of the conduit or flue 6 which extends into the gin-house or ginnery (not here illustrated) may be constructed in any suitable manner; but I prefer to construct the same substantially as described and shown in any one of the Letters Patents heretofore issued to me and numbered, respectively, 472,607, 488,446, and 560,914, whereby the cotton carried to the gin-house or ginnery is automatically fed to the gins.

The conduit or flue 6 is placed in operative connection with an air-suction apparatus or fan in the gin-house or ginnery, and this apparatus or fan may be the same apparatus or fan which communicates with the conduit or flue 5, although a separate suction apparatus or fan may be employed.

The suction device by which the seed-cotton is conducted from the bins or compartments to the conduit or flue 6 is composed of telescopic sections 41, 42, and 43, adapted to slide one in another and to be placed in communication with the interior of the conduit or flue, as will hereinafter appear. The number of telescopic sections is immaterial and may be increased or diminished, according to the conditions required.

The upper section 41 is connected by a flexible section 44, of canvas or any other material suitable for the purpose, with a box-like carriage 45, having hangers 46, adapted to travel upon rails or tracks 47, secured to the opposite sides of the conduit or flue 6. Inasmuch as the suction device composed of the telescopic sections 41, 42, and 43 is much less bulky and very much lighter in weight than the cotton-discharging box or chute 18 it is possible to dispense with wheels or roller-bearings on the hangers 47; but they may be employed, if desired. The flexible section 44 is designed to permit the telescopic suction device to be shifted from side to side of the partition or wall 4, so that the cotton can be taken from any of the bins from either side of this partition or wall. The suction device can be retracted by simply drawing or pulling upon the cable or rope 48, which is preferably made with two branches 49, passing over pulleys or supports 50 and extending down to the extremity of the telescopic section 43, where the ends of the sections 49 are attached. Obviously by pulling upon the cable 48 the telescopic suction device can be retracted to the required extent, and then the cable can be fastened to the hook or other suitable device 57, secured to the lower end of the telescopic section 43, thereby holding the suction device retracted. The suction device can be extended from time to time to meet the conditions required by simply loosening the cable 48 until the desired extension is secured and then fastening the cable to the hook 51.

The telescopic suction device is designed to be moved or shifted longitudinally with relation to the conduit or flue 6 in substantially the same manner as the cotton-discharging box or chute 18, and the upper end of the suction device is adapted to be placed in communication with the interior of the conduit or flue 6 by constructing the latter at certain intervals with openings controlled by doors 52, which are preferably hinged at one end, as at 53, and when closed or when turned to a horizontal position forming continuations of the bottom wall of the conduit or flue 6. The doors 52 are each adapted to open inwardly into the conduit or flue 6, and if the telescopic suction device is coincident with the opening controlled by one of the doors 52 and the air-suction apparatus or fan with which the conduit or flue 6 communicates is set in operation the air will be exhausted from the suction device, and if the latter is in proper position to take seed-cotton from any one of the bins or compartments the seed-cotton will be drawn upward through the suction device into the conduit or flue 6 and then be carried to the gin-house or ginnery and, if desired, deposited or fed into cotton-gins.

The telescopic suction device is designed to be held stationary when moved to register with one of the openings controlled by a door 52. This may be accomplished through the medium of any suitable means, but, for the sake of simplicity, I prefer to use a hook, as at 54, engaging an eye, as at 55. The hook may be mounted on the upper end portion of the telescopic suction device, in which case the eye will be secured to the side of the conduit or flue 6.

The doors 52 are each designed to be secured in its closed and open position, and while any suitable means may be employed for this purpose I prefer to provide each door with a bolt 56, which is susceptible of moving lengthwise with relation to the door 52, and also moving sidewise or longitudinally with relation to said door. This may be accomplished by arranging the bolt 56 in a recess in one end of the door 52 and providing the bolt with slots 57, through which extend pins 58, the slots being of such dimensions that the bolt can be moved lengthwise and sidewise, as before explained. The bolt is provided with a suitable knob or handle 59, adapted to be reached through a recess 60, formed in one end of the door 52. When the door is opened inwardly to stand in the inclined position, (shown in Fig. 12,) the bolt 56 is moved lengthwise, so that one of its ends engages a recess in the side wall of the conduit or flue 6. When the door is closed, the bolt is moved sidewise, or longitudinally with relation to the door, so that one side of the bolt can be made to engage a recess 61 in one edge of the opening formed in the conduit or flue 6.

The locking-bolt for securing the door 52 in its open or closed position may, however, be variously modified without altering the spirit of my invention. In fact any means whatever may be employed for holding the door open or closed.

When one of the doors 52 has been opened and secured by its bolt 56 to stand in the inclined position, (best seen in Fig. 12,) the telescopic suction device is shifted into a position coincident with the opening controlled by the door, and is then secured in a fixed position, as by engaging the hook 54 with the eye 55.

The air-suction apparatus or fan connected with the conduit or flue 6 will exhaust the air from the telescopic section, and if the lower end of the latter is in proper position to take seed-cotton from one of the bins or compartments the seed-cotton will be lifted into the conduit or flue and swiftly transported to the gin-house or ginnery. As the cotton in the bin or compartment is removed the telescopic section can be lengthened to suit the conditions required, and when the seed-cotton in one row of bins has been removed the suction device can be shifted to remove the cotton from the other row of bins, as will be obvious without further explanation.

The hangers 46, described with reference to the carriage 45, may simply be the upward extensions of the sides of this carriage, or they may be of any other construction suitable for the purpose.

The flexible section 44, forming part of the telescopic suction device, is secured at its upper edge to the carriage 45 by means of a ring-shaped frame 62, while its lower edge may be secured to the section 41 of the suction device by riveting or otherwise. The flexible section 44 provides a joint which enables the suction device to be moved in various directions to suit the conditions required in taking the cotton from different parts of the storage building or house or from the different bins or compartments therein.

As shown in Fig. 9, the ends of the carriage 45 may be provided with packing-strips 63 to secure a substantially air-tight closure between the ends of the carriage and the under side of the conduit or flue 5. Packing may also be arranged wherever desirable or necessary.

It will be understood that one end of the conduit or flue 5 is closed air-tight to exclude the entrance of air thereinto.

It will also be understood that when the cotton-discharging box or chute 18 is to be moved along the conduit or flue 5 the deflecting-valve 25 should be swung downward into the position shown in Fig. 8, so that it will extend into the box or chute and not obstruct the traveling motion of the latter on the rails or tracks of the conduit or flue.

As regards the screen 22 and its supporting-frame, the construction of these parts may be variously modified without altering the spirit of my invention.

It will be evident that the cotton-discharging box or chute may be made of such size that the suction will not require to be interrupted or stopped very frequently for the purpose of delivering or discharging the cotton during the unloading of a vehicle. In this event I prefer to arrange a valve in the conduit or flue 6, adapted to be opened and closed by disk or wheel 64, as in the modification, Fig. 16, this disk or wheel being mounted on the rod of the valve for the purpose of moving the latter. The disk or wheel is provided with a weight, as at 65, which serves to automatically open the valve and hold it open. The valve is closed by the attendant or workman through the medium of a connection between a handle 66 and the disk or wheel 64. This connection is preferably composed of a cord or other cable 67, extending vertically along the telescopic section 10, over a guide-pulley 68, and horizontally along the conduit or flue 6 to the disk or wheel 64 in such manner that the attendant or workman who controls the movements of the telescopic section 10 can at suitable intervals, or whenever required, operate the handle 66, and thereby close the valve which is arranged in the flue 6 and is connected with the shaft of the disk or wheel 64. It is possible for the attendant or workman to determine when to operate the valve, because when the discharging box or chute is filled with cotton the suction becomes weak and is noticeable.

If the discharging box or chute is made very large, the doors, flaps, or valve 31 might not close by the action of the suction-fan, but in this case the doors can be balanced so as to close very easily and require but little force to accomplish this result. When the doors are closed, the external air-pressure will hold them closed.

The primary feature of my present invention resides in a cotton-discharging box or chute arranged in operative connection with and susceptible of a traveling motion relatively to a conduit or flue through which cotton is caused to move, whereby the cotton-discharging box or chute can be moved or shifted to different positions for the purpose of receiving the cotton from the conduit or flue and delivering it at any desired point— as, for instance, into any one of a plurality of storage bins or compartments.

The secondary feature of my invention resides in a cotton-elevating device arranged in operative connection with a cotton conduit or flue and movable relatively thereto, so that it can be shifted from place to place while remaining in operative connection with said cotton conduit or flue to elevate or remove the cotton from different points or from any one of a plurality of cotton-storage bins or compartments and deliver the same into a gin-house or into cotton-gins, where the lint-cotton is separated from the cotton-seed in the usual manner.

As regards the primary and secondary features above mentioned, I wish it clearly understood that I do not confine myself to the specific construction and arrangement of parts illustrated in the drawings, as they may be variously modified without altering the spirit of my invention.

Having thus described my invention, what I claim is—

1. The combination of a pneumatic conduit or flue through which cotton is moved by air-pressure, an air apparatus for causing air to flow through the conduit or flue, a cotton-discharging box or chute slidable longitudinally along said box or chute, means for placing the box or chute in communication with the pneumatic conduit or flue, means for directing the moving air and cotton from the conduit or flue into the box or chute, and means for intercepting the cotton in the box or chute and permitting the air to move onward therefrom, substantially as described.

2. The combination with a conduit or flue provided with a trackway, of a cotton-discharging box or chute movable upon said trackway longitudinally of the box or chute, means for placing the box or chute in communication with the conduit or flue at different points, a device carried by the box or chute for directing the moving cotton from the conduit or flue into the box or chute, and means whereby the cotton delivered into the box or chute is prevented from passing back into the conduit or flue, substantially as described.

3. The combination with a conduit or flue through which cotton is moved, and a trackway arranged in operative connection with the conduit or flue, of a cotton-discharging box or chute slidable on said trackway longitudinally of the box or chute, opening and closing doors for placing the box or chute and conduit or flue in communication with each other at different points, means for directing the moving cotton from the conduit or flue into the box or chute, and means for preventing the cotton delivered into the box or chute from passing back into the conduit or flue, substantially as described.

4. The combination with a conduit or flue through which cotton is moved, of a longitudinally-traveling box or chute provided with a screen in its upper portion, means for placing the box or chute and the conduit or flue in communication with each other at different points, and a device for intercepting the cotton in its passage through the conduit or flue and deflecting it into the box or chute, substantially as described.

5. The combination with a conduit or flue through which cotton is moved from a receptacle, such as a vehicle, of a longitudinally-traveling cotton-discharging box or chute arranged in operative connection with the conduit or flue and provided with means for delivering or distributing cotton, substantially as described.

6. The combination with a conduit or flue having a track and through which cotton is moved, of a cotton-discharging box or chute suspended from and movable on the said track, and means for placing the box or chute and the conduit or flue in communication with each other at different points for delivering or distributing the cotton from the conduit or flue, substantially as described.

7. The combination with a conduit or flue through which cotton is moved, of a cotton-discharging box or chute movable longitudinally with relation to the said conduit or flue, means for placing the box or chute in communication with the conduit or flue at different points, and a delivering or distributing apron or shoe arranged at the lower end of the box or chute, substantially as described.

8. The combination with a conduit or flue through which cotton is moved from a receptacle, of a cotton-discharging box or chute movable longitudinally with relation to the conduit or flue, means for placing the box or chute in communication with the conduit or flue, and a tilting apron or shoe arranged at the lower end of the box or chute for delivering or distributing the cotton in different directions, substantially as described.

9. The combination with a conduit or flue through which cotton is moved from a receptacle, of a cotton-discharging box or chute movable longitudinally with relation to the conduit or flue, means for causing the cotton to pass from the conduit or flue into the box or chute, and a reversible apron or shoe arranged at the lower end of the box or chute for delivering or distributing the cotton in different directions, substantially as described.

10. The combination with a conduit or flue through which cotton is moved from a receptacle, of a cotton-discharging box or chute movable longitudinally with relation to said conduit or flue and provided with means for opening and closing its lower end, and suitable means whereby the cotton may be deflected at different points from the conduit or flue into the box or chute, substantially as described.

11. The combination with a conduit or flue through which cotton is moved, of a cotton-discharging box or chute movable longitudinally with relation to the conduit or flue, and a deflecting-valve for deflecting the cotton from the conduit or flue into the box or chute, substantially as described.

12. The combination with a conduit or flue through which cotton is moved from a receptacle, of a cotton-discharging box or chute movable longitudinally with relation to the said conduit or flue, and a cotton-deflecting valve carried by the box or chute and susceptible of being extended into the conduit or flue to deflect the cotton therefrom into the box or chute, substantially as described.

13. The combination with a conduit or flue through which cotton is moved from a receptacle, of a cotton-discharging box or chute provided at it lower end with pivoted doors and movable longitudinally with relation to said conduit or flue for discharging cotton therefrom at different points, substantially as described.

14. The combination with a conduit or flue through which cotton is moved from a receptacle, of a cotton-discharging box or chute movable longitudinally with relation to the said conduit or flue and provided at its lower end with pivoted doors and a pivoted apron or shoe, substantially as described.

15. The combination with a conduit or flue through which cotton is moved from a receptacle, of a cotton-discharging box or chute movable longitudinally with relation to said conduit or flue, a screen arranged in the upper portion of the box or chute and provided with an opening through which cotton may pass from the conduit or flue into the box or chute, and a device for deflecting the cotton from the conduit or flue into the box or chute, substantially as described.

16. The combination with a conduit or flue provided with a track and through which cotton is moved from a receptacle, of a cotton-discharging box or chute having roller-bearings mounted on said track for moving the box or chute longitudinally with relation to the conduit or flue, and means for placing the box or chute in communication with the conduit or flue at different points, substantially as described.

17. The combination with a conduit or flue provided with opening and closing doors, of a discharging box or chute movable longitudinally with relation to the conduit or flue and adapted to be placed in communication with the same through any one of the door-openings, and means for deflecting cotton from the conduit or flue into the box or chute, substantially as described.

18. The combination with a conduit or flue through which cotton is moved from a receptacle, of a cotton-discharging box or chute suspended from and movable longitudinally on the conduit or flue, means for placing the box or chute and the conduit or flue in communication at different points, a screen arranged in the upper portion of the box or chute, and a pivoted deflecting-valve adapted to extend across the conduit or flue to intercept the cotton and deflect the same into the box or chute, substantially as described.

19. The combination with a conduit or flue through which cotton is moved, of a cotton-discharging box or chute movable longitudinally with relation to said conduit or flue, means for opening and closing the lower end of the box or chute, means for placing the upper end of the box or chute in communication with the conduit or flue at different points, and a delivering or distributing apron or shoe pivotally suspended at the lower end of the box or chute, substantially as described.

20. The combination with a conduit or flue through which cotton is moved, of a cotton-discharging box or chute movable longitudinally with relation to the conduit or flue and provided at its upper end portion with a screen and a pivoted cotton-deflecting valve adapted to be extended into the conduit or flue to deflect the cotton therefrom into the box or chute, means for opening and closing the lower end of the box or chute, and an apron or shoe for delivering or distributing the cotton in different directions from the lower end of the box or chute, substantially as described.

21. The combination with a conduit or flue through which cotton is moved, of a cotton-discharging box or chute movable longitudinally with relation to the conduit or flue and provided at its upper end portion with a screen, a shaft journaled on the box or chute and having a weighted arm, and a cotton-deflecting valve secured to said shaft and turning therewith so that it can be extended into the conduit or flue to deflect the cotton therefrom into the box or chute, substantially as described.

22. The combination with a conduit or flue having rails or tracks, of a discharging box or chute suspended from the rails or tracks and movable thereupon longitudinally of the conduit or flue, a screen arranged in the upper portion of the box or chute, means for placing the box or chute in communication with the conduit or flue at different points, pivoted doors for opening and closing the lower end of the box or chute, and a reversible apron or shoe arranged at the lower end of the box or chute for delivering or distributing cotton in different directions, substantially as described.

23. The combination with a conduit or flue through which cotton is moved from a receptacle, of a cotton-discharging box or chute movable longitudinally with relation to said conduit or flue, means for effecting a substantially air-tight connection between the edges of the box or chute and the sides of the conduit or flue, means for placing the box or chute in communication with the conduit or flue at different points, and a device for deflecting cotton from the conduit or flue into the box or chute, substantially as described.

24. The combination with a conduit or flue through which cotton is caused to move, of a suction device arranged in operative connection with said conduit or flue and movable longitudinally thereof for elevating or removing cotton from various points and causing the same to enter said conduit or flue for conveyance to a desired point, substantially as described.

25. The combination with a conduit or flue through which cotton is caused to move, of a telescopic suction device arranged in operative connection with said conduit or flue and movable longitudinally thereof for elevating or removing cotton from various points and causing the same to enter the conduit or flue for conveyance to a distant point, substantially as described.

26. The combination with a conduit or flue through which cotton is caused to move, of a suction device arranged in operative connection with said conduit or flue and movable longitudinally thereof, and means for placing the said suction device in communication with the said conduit or flue at different points, substantially as described.

27. The combination with a conduit or flue through which cotton is caused to move, of a telescopic suction device suspended from and movable longitudinally on said conduit or flue, and means for placing the suction device in communication with the conduit or flue at different points, substantially as described.

28. The combination with a conduit or flue through which cotton is caused to move, of a suction device arranged in operative connection with said conduit or flue and movable longitudinally thereof, and opening and closing doors for placing the suction device in communication with the conduit or flue at different points, substantially as described.

29. The combination with a conduit or flue through which cotton is caused to move, of a suction device arranged in operative connection with said conduit or flue and movable longitudinally thereof, opening and closing doors for placing the suction device in communication with the conduit or flue at different points, and means for holding the doors opened and closed, substantially as described.

30. The combination with a conduit or flue provided with rails or tracks, of a telescopic suction device suspended from and movable longitudinally along said rails or tracks, and means for placing the suction device in communication with the conduit or flue at different points, substantially as described.

31. The combination with a conduit or flue through which cotton is caused to move, of a traveling suction device suspended from the conduit or flue and provided with a flexible or jointed portion which enables the suction device to be moved in different directions, and means for placing the suction device in communication with the conduit or flue, substantially as described.

32. The combination with a conduit or flue through which cotton is caused to move, of a suction device suspended from and movable longitudinally on said conduit or flue, means for placing the suction device in communication with the conduit or flue at different points, and devices for holding the upper end of the suction device stationary with relation to the conduit or flue, substantially as described.

33. The combination with a conduit or flue through which cotton is caused to move, of a traveling carriage mounted on the conduit or flue, telescopic suction devices flexibly connected with said carriage and traveling therewith, and means for placing the telescopic suction devices in communication with the interior of said conduit or flue at different points, substantially as described.

34. The combination with a cotton-conveying conduit or flue, of a cotton-distributer movable longitudinally from place to place relative to the conduit or flue for delivering the cotton therefrom at any desired point, substantially as described.

In testimony whereof I have hereunto set my hand in presence of two subscribing witnesses.

STEPHEN D. MURRAY.

Witnesses:
H. E. HAMILTON,
F. HARRIS, Jr.